W. N. HILL.
METHOD OF HEATING GAS FOR MOTIVE POWER.
No. 180,478. Patented Aug. 1, 1876.
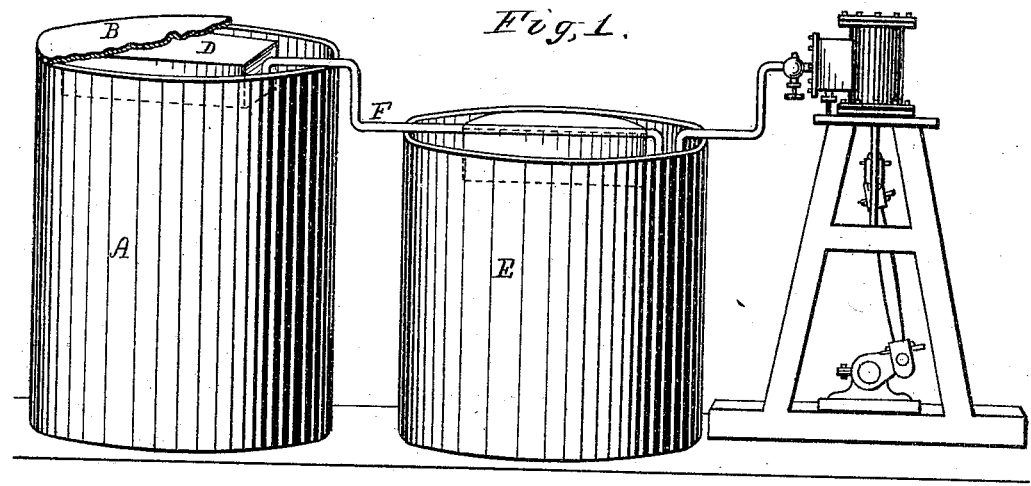
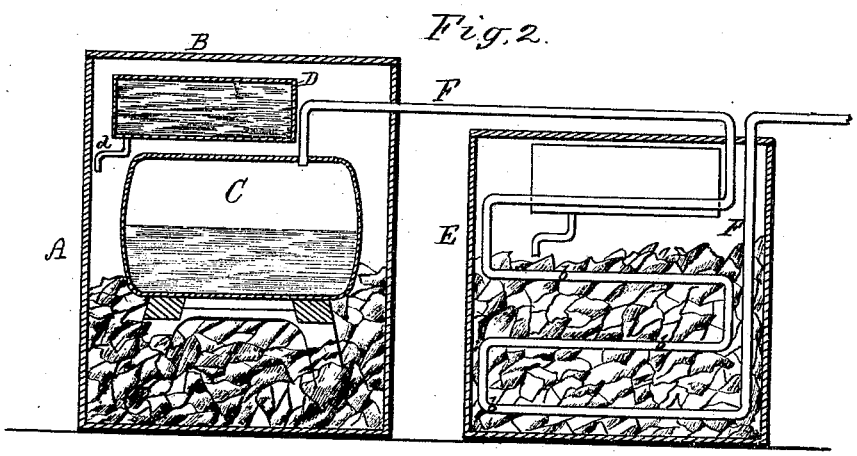

UNITED STATES PATENT OFFICE.

WALTER N. HILL, OF NEWPORT, RHODE ISLAND.

IMPROVEMENT IN METHODS OF HEATING GAS FOR MOTIVE POWER.

Specification forming part of Letters Patent No. 180,478, dated August 1, 1876; application filed December 8, 1875.

*To all whom it may concern:*

Be it known that I, WALTER N. HILL, of Newport, in the county of Newport and State of Rhode Island, have invented a certain new and useful Method of Heating Carbonic-Acid Gas, Ammonia, and other gaseous matters suitable for operating motors adapted thereto, and apparatus for heating the same; and I do hereby declare that the following specification, taken in connection with the drawings furnished and forming a part of the same, is a clear and correct description of my invention.

In operations with gaseous matters in connection with motors, heat is required to a greater or lesser extent for inducing a desirable degree of gaseous tension, and, so far as my knowledge extends, the heat thus required has always been heretofore derived from a fire, as in a grate or fire-box of a steam-boiler, or from the combustion of the inflammable gases, as from a gas-burner.

The object of my invention is to provide a means for heating these gaseous matters without employing a fire, because under many circumstances it is impracticable and undesirable to do so.

My invention consists, mainly, in a novel method of heating gaseous matters to be employed in motors, which consists in exposing a retort containing said matters to the action of heat evolved from quicklime or other suitable non-combustible matter, whereby smoke is obviated and the heating of the gaseous matters effected without the aid of atmospheric air; and, further, in providing the retort or chamber which contains the gaseous matter with an inclosing-chamber, arranged for the reception of any suitable matters which, while undergoing chemical action, or while being chemically decomposed, will generate sufficient heat to secure a desirable degree of pressure within the retort; and, further, in providing said inclosing-chamber with an auxiliary chamber or vessel, which communicates therewith, and which is arranged to deliver water or other suitable liquid contained therein into the inclosing-chamber, and upon the matter with which it is to co-operate; and, further, in the combination, with a coil-pipe which communicates with the retort, of an inclosing-chamber of the character referred to, with or without the auxiliary chamber, whereby the gaseous matter, in its course from the retort to the motor, may be subjected to heat, and its tension increased to a desirable degree.

In the drawings I have illustrated a desirable form of apparatus for carrying out my invention.

Figure 1 represents the apparatus in perspective, connected with a simple vertical engine. Fig. 2 represents the same in longitudinal vertical section.

A denotes the chamber, which is arranged to receive the material to be chemically acted upon or decomposed. This chamber is preferably provided with a close-fitting cover, as at B. C denotes the retort which contains the gaseous matter, which may be carbonic-acid gas, ammonia gas, or any other gas capable of being liquefied, and suitable for the purpose. This retort is placed within the chamber A, and is elevated upon suitable supports in such a manner as to provide free space around it. At one end the retort is provided with a heavily-capped inlet, through which it is charged with the carbonic acid or other suitable gaseous matter.

Within the chamber A, and filling the space around the retort C, I place (as shown in this instance) unslaked or quick lime, which is well adapted for generating heat in this connection.

D denotes a chamber for containing water or other liquid matter requisite to be supplied to the lime. It is placed above the retort C within the chamber A, and is provided with a pipe, $d$, which may be arranged to deliver water intermittently or continuously upon the lime within the inclosing-chamber. E denotes another inclosing-chamber, which is also arranged to contain lime or other suitable matter. This chamber may or may not be provided with a cover, although a cover is preferred by me. F denotes a conducting-pipe, through which the expanded gas passes from the retort C to the engine to be driven. The pipe F is connected with the retort C at its top, and passes out through the side of the chamber A near the top thereof, enters the chamber E, and, passing down into said chamber, is formed into a series of coils or bends, b, from which it passes out at the top of the chamber for connection with the engine. Cocks are provided in the pipe at the points where it is connected with the retort C and the engine, by which means the passage of the gas may be regulated. As shown in the drawing, the chamber E is filled, or nearly so, with unslaked lime, which completely surrounds the coil of the pipe F.

In practice with the apparatus here illustrated, the retort C is first charged with the carbonic-acid or other gas in a liquid form under high pressure. The unslaked lime is then placed within the tank, and surrounding the retort C. The chamber D having been filled with water, the latter is allowed to drop through the pipe d upon the lime, either intermittently or continuously, as may be desired. The contact of the water with the lime at once generates heat, which, being imparted to the contents of the retort, induces an expansion of the gaseous matter. In this condition the gas is delivered from the retort into the pipe F, and passing through the bends of said pipe within the chamber E, (water having been first poured upon the lime therein,) the expanded gas is still further subjected to heat, and in this highly-expanded condition is allowed to pass to the engine or motor.

Carbonic-acid gas having a very high tension, depending upon its temperature, it is evident that as the gas is taken from the retort C the tension will be lessened, unless the application of heat is continued until the whole of the gas has been driven from the retort. As the rapid expansion of gases inevitably induces a low temperature, it is essential that heat be employed for maintaining desirable tension.

It will be observed that by the arrangement here illustrated and described I am enabled to supply a large amount of heat, and thus, as the gas is drawn for use, to keep up its temperature, and consequently its tension. It is also desirable that the same or similar means be employed for heating the engine-cylinder. In some instances the heat imparted by warming the retort C or the pipe F, or even the engine-cylinder alone, will be found to fully serve the desired purpose.

In many special cases in which ammonia or carbonic-acid gas in a liquefied condition is especially adapted as a source for motive power, the use of the ordinary methods of supplying heat—such as by fire, steam, &c.—are impracticable.

The method herein described of supplying heat to carbonic-acid gas, &c., when it is undergoing expansion from the liquid state under high compression, maintains a high degree of expansive force.

I have thus far described the mode of applying heat generated from unslaked lime and water. These are perhaps the most desirable matters for the purpose, although other matter—such, for instance, as sulphuric acid—may be employed for effecting the same purpose. If, instead of the unslaked lime, it should be desirable to use sulphuric acid or other chemical matter suitable for the purpose, it is obvious that the chamber for containing it should be provided against corrosion, and with an agitator or equivalent means, whereby the water and acid could be well mixed.

Instead of an agitator operating mechanically within the acid-chamber, a series of jet-pipes might be employed, through which, by means of power from the motor and a suitable pump, water might be injected into the body of acid contained within the chamber at such intervals and in such quantities as will most effectually accomplish the purpose desired.

Instead of having the water-chamber arranged to allow water to drip from its pipe, a pump could be employed, as last suggested, in connection with lime.

My invention has great value in connection with operations with so-called submarine torpedo-boats, as the fires thereon are difficult to manage, and the smoke therefrom would render the movements of the boat conspicuous at times when it should be otherwise.

It will be seen that by my novel method of heating gases to be employed in motors the requisite degree of heat may be attained without the aid of atmospheric air, which is indispensable for feeding a fire, and which it would be impracticable to provide in the case of a boat wholly submerged, and also that no necessity exists for any discharge pipe or pipes, except those which could be wholly submerged and provided with check-valves to prevent the entrance of water.

I am aware that it has been heretofore proposed to employ quicklime instead of a fire for cooking purposes.

Having thus described my invention, I claim as new, to be secured by Letters Patent—

1. The novel method of heating gaseous matters to be employed in motors, which consists in exposing a retort containing said matters to the action of heat evolved from quicklime or other suitable non-combustible matter, substantially as described, whereby smoke is obviated and the heating effected without the aid of atmospheric air, as set forth.

2. The combination, with a retort for containing liquid gaseous matters to be employed in connection with a motor, of an inclosing-chamber, arranged to receive quicklime or other matters from which heat may be evolved during their exposure to chemical action or decomposition, substantially as described.

3. The combination, with a retort for containing gaseous matters and its inclosing-chamber, of a water-chamber, arranged to deliver its contents intermittently or continuously upon the material to be chemically acted upon or decomposed, substantially as described, whereby heat may be evolved for the expansion of the gaseous matters, as set forth.

4. The combination, with the retort and its inclosing-chamber, of an auxiliary chamber for containing material to be chemically acted upon or decomposed, and a conducting-pipe connected with the gas-retort, and passing through said auxiliary chamber and its decomposing material, substantially as described, whereby the gas is subjected to additional heat in passing from the retort to the motor.

WALTER N. HILL.

Witnesses:
F. M. BARBER,
JOB T. LANGLEY.